Jan. 5, 1943.   H. S. POLIN ET AL   2,307,710
ROASTING PROCESS AND CONTROL
Filed July 16, 1940
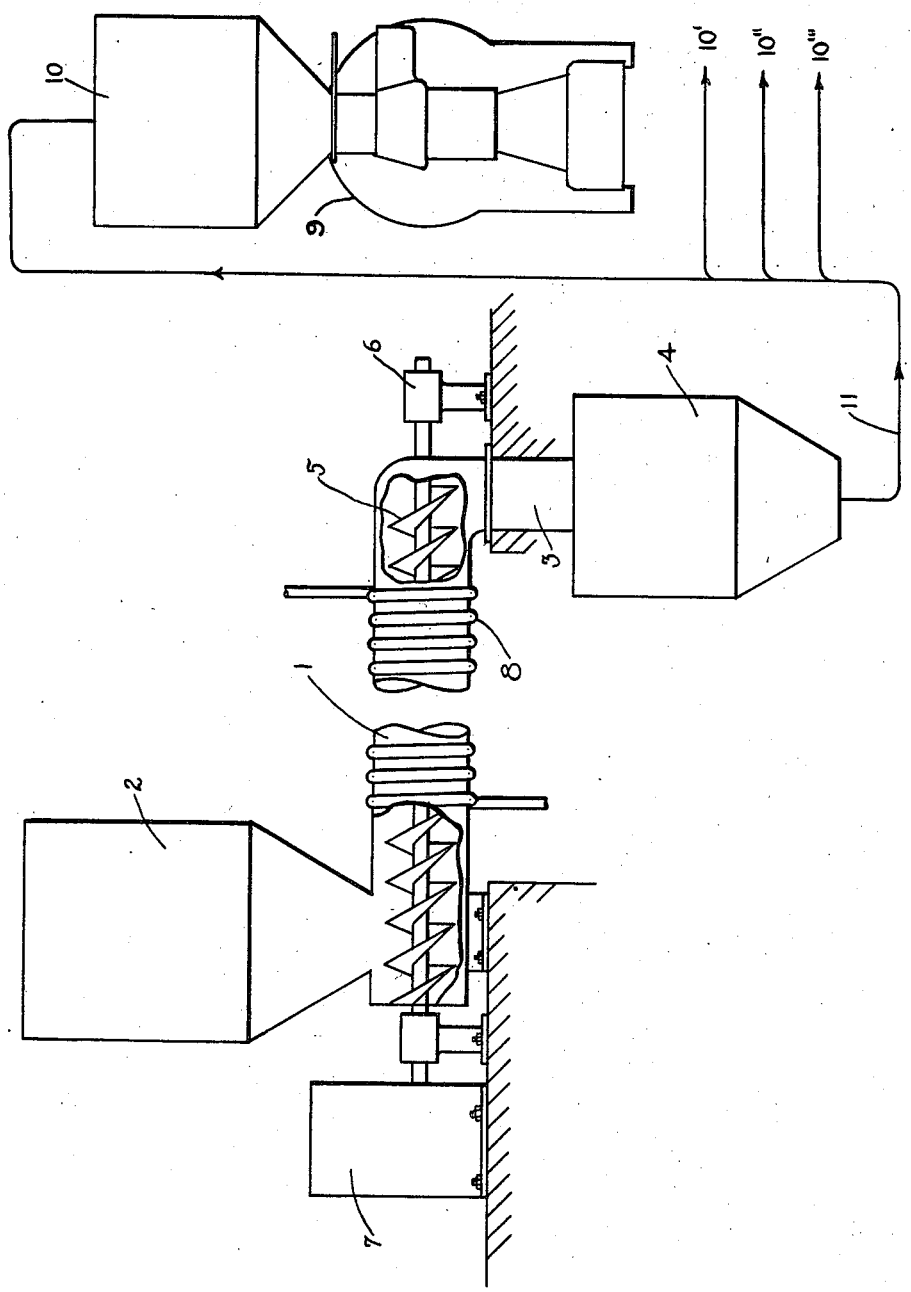
INVENTORS
HERBERT S. POLIN
JOSEPH F. AIMS
BY William F. Nickel
ATTORNEY Patented Jan. 5, 1943

2,307,710

UNITED STATES PATENT OFFICE 2,307,710

ROASTING PROCESS AND CONTROL

Herbert S. Polin, New York, N. Y., and Joseph F. Aims, Teaneck, N. J., assignors to The Great Atlantic and Pacific Tea Company, a corporation of New Jersey Application July 16, 1940, Serial No. 345,732

4 Claims. (Cl. 99—68)

This invention relates to improvements in methods of treating substances to be used in the making of beverages for human consumption; and particularly to a process for roasting coffee beans in large quantities expeditiously, but still in a manner that ensures the qualities in the finished product needed to give the best flavor and taste.

In our prior copending application, now Patent No. 2,270,768, granted January 20, 1942, we have shown and described a method and apparatus for roasting coffee, and so conducting the operation that the roasting is stopped as soon as a predetermined condition of the roasting mass is reached. During the roasting, new substances are formed in the bean, and some of these are volatile organic acids, which acids have been shown to indicate the stage of roasting as regards the development of desired taste and aroma characteristics.

Such acids originate in a definite range of temperature and being volatile are simultaneously driven off. The moment at which the roasting coffee reaches its state of "optimum" taste and aromatic characteristics can be ascertained by measuring certain of the compounds either in the coffee, or expelled from the coffee during the roasting process, and especially by measurements of volatile acids (or their effects) in the coffee or simultaneously being driven off in the roasting.

The particular condition of the roasted coffee at which "optimum" taste is given is distinguished by a degree of acidity of the coffee, due to the presence therein of the organic acids above mentioned. Hence, by carrying on the roasting until the acidity has a predetermined value or degree, and at this point terminating the roasting, a product of the desired characteristics can be produced. These organic acids are generally volatile, and are only partly expelled. The rate of expulsion increases as the roasting goes on, until the amount of the acids residual in the coffee no longer increases, but starts to decrease. When this stage is reached, or in the close neighborhood of this stage, the residual acids indicate that the desired state of roasting has been attained and the roasting is then concluded. The amount of volatile acids driven out of the coffee can be directly related to the amount of residual acids and thus bears a definite relation to the taste and aroma which the coffee, when roasted by the process described, affords when prepared as a drink.

Therefore the roasting is continued till the organic acids are formed and driven off, and until the quantity remaining, or residual in the coffee, is such as to indicate that the coffee has attained the state that gives the best taste for drinking. When the roasting has commenced, a temperature of 300° F. or thereabout marks the point where the acids begin to form, and they increase in quantity in the coffee bean above this temperature very rapidly to a maximum and then fall off. For each sample of the same mass in one batch, the maximum amount of acidity that can be produced in the coffee by roasting is very nearly constant, and if a constant quantity is distilled out, the remainder will be constant, and thus an indicator of the desired condition when the coffee is best for drinking can be infallibly obtained. Therefore if a sample of a quantity of coffee is so roasted that it can be made into a drink having the desired taste, and the amount of organic acids driven off from it in roasting is measured, the sample furnishes the indication to be followed; because the necessary condition has been attained. The entire quantity of coffee is then roasted until the amount of organic acids volatilized from it corresponds to that given off by the sample; leaving in the coffee only the residual, indicative quantity permitted, and the coffee will be found, when taken from the roaster, to be in the state or condition which gives the best taste and flavor for drinking. The measuring can be done by absorbing part of the gases in water containing a pair of electrodes connected to a suitable instrument, which always reads the same for a given degree of acidity of the water into which the electrodes project.

The method is satisfactory and certain, but for large quantities of coffee the complete roasting of a number of batches separately, each according to the requirements of an approved sample, will be a long task and involve a great deal of expense. To proceed with the minimum expenditure of time and labor, a large quantity of coffee can be pre-roasted, and then divided into portions or batches for final roasting separately. The roasting of a batch after pre-roasting will consume only a few minutes before it reaches a condition conforming to the characteristics of the sample.

At the present time, to the best of our knowledge, the commercial roasting operations, while being performed by different methods, are all similar in one respect, which is: that they are all completely performed in one continuous operation or in consecutive operations within the same unit of equipment. But to perform the preheating or dehydrating function in the same roasting cylinder (or cylinders) as the final roasting function, which in order to be entirely satisfactorily performed must be technically controlled, is expensive from an operating standpoint and is not conducive to the best control and uniformity of product.

We therefore choose to separate the preliminary heating and dehydrating steps, which require a minimum of control technically and which can be more economically performed independently, from the finishing roast function, which must, of course, be carefully controlled for best results. Thus we achieve both economy and improved control of the product.

Equipment to perform the dual purpose of preheating and finishing the roast requires that the major part of the complete roasting cycle is consumed (about thirteen to fourteen minutes) in the preliminary and relatively unimportant preheating operation, while only approximately two to two and one-half minutes are required for the highly essential flavor development function which must be under extreme technical control at all times.

The separation of the pre-heating and dehydrating functions from the roasting function would allow for the use of very large, high speed units especially constructed for this purpose. Such units could very easily perform the relatively unimportant pre-heating and dehydrating functions satisfactorily at a very high speed. As an example: this function eliminates the requirement of emptying batch roasters and recycling the entire roasting operation. It could best be performed in a continuously fed-rotating cylinder. The finishing roast function, as heretofore stated, can be performed within two to three minutes.

We have found by numerous analyses that no great change occurs in the chemical constituents of coffee up to a temperature of 300° F. during a typical roasting cycle. In fact the volatilization of the organic acids that indicates that the coffee is in the state capable of giving the best flavor does not begin till about 350 degrees F. At that point the volatile substances in the coffee commence to be distilled out, and soon the instrument shows a reading given by the degree of acidity indicating that the coffee has attained its optimum condition. Hence observation of the nature and effect of these volatile constituents is not demanded till the temperature in the neighborhood of 350° F. is realized, or until the bean begins to change color.

In view of this fact, coffee in large quantities can be put through a preliminary roasting operation up to the neighborhood of 350 degrees F., without necessitating any observation of the amount of acidity by which the separated gases are characterized. The large mass can then be separated or divided into small batches of selected bulk, say several hundred pounds each, and each finally roasted to such a point above or in the neighborhood of 350 degrees till the final condition for giving coffee its desirable characteristic is reached. This condition is ascertained by proceeding in the manner which our aforesaid application sets forth; that is, by measuring the development of the volatile acids as the roast reaches a critical temperature and terminating the roast at a point near the maximum of the volatile acidity value. Each batch is similarly controlled.

The operation thus enables a huge quantity of coffee to be roasted in bulk with little attention up to the neighborhood of 350 F., and then batch-roasted for finishing. Each batch will be roasted for only a short interval, and the terminating point is established by the instrument reading at the degree of acidity of the gases which has been selected. The operation is thus carried out with the minimum labor and attention.

Roasting a mass of coffee up to about 350 degrees F. usually produces only a slight change even in color except that the moisture is driven off and thus the coffee is prepared for the final roasting operation. Beyond this point the changes all affect the coffee with respect to its acceptability as a beverage.

The apparatus may consist of a pre-roasting unit discharging into a hopper, and a batch-roaster or multiplicity of batch roasters equipped with controls such as illustrated in our said prior application or any other suitable type; the required smaller charges being taken from the hopper and delivered to the batch roaster as required; and the terminating point can be controlled with great exactness for each batch that is put into it.

The object and advantages of the invention are fully set forth hereinbelow, but we may vary the steps of the process and details of the apparatus utilized without changing the essential characteristics of the improvement or departing from the principle thereof.

On the drawing, the figure shows apparatus for performing the process in the preferred manner.

The casing 1 of the pre-roasting unit is tubular and preferably mounted in horizontal position. At one end it is connected to a charging hopper 2, which is loaded with the coffee beans, and at its opposite end is an outlet 3 delivering to a discharge hopper 4. In the casing is a screw-conveyor 5, extending along the length thereof to impel the contents toward the outlet through which the coffee beans drop into the hopper 4. The shaft of the conveyor extends through the casing at both extremities and is mounted in bearings as at 6. It is connected to a suitable motor and gearing in a housing 7 to receive power for proper operation. This unit is of large capacity and the contents are roasted as above stated up to say 350 degrees F., but preferably no higher. Encircling the casing is a heating coil 8. This heater is filled with a heating medium such as a suitable thermal salt to impart the required temperature to the interior of the casing 1, or the roaster may use any other heating medium, such as oil, gas, etc., controlled in any suitable manner to give the result desired, as described for example in Patent No. 1,970,499.

The batch-roaster is shown at 9, but is only diagrammatically presented. It has the design and equipment set forth in our said prior application, and is adapted to roast several hundred pounds of coffee at a time, after the coffee is pre-roasted in casing 1. It has a charging hopper 10 connected by a suitable conduit indicated at 11 to the receiving hopper 4. The pre-roaster and batch roaster can be set up in any suitable relative positions, and any suitable means may be installed to facilitate the transfer of successive batches from the hopper 4 to the hopper 10. For a single supply of coffee beans all known to have the same characteristics, a single approved sample is sufficient, even if the supply is large enough to fill the pre-roaster several times. For each operation of batch roasting, the unit (or units) 10 is adjusted to turn out coffee of the same kind as the sample.

Several batch-roasters of relatively small capacity may of course be installed and operated simultaneously, each connected to the hopper 4. Each of the batch-roasters will be strictly controlled to perform the final stage in the process, and the contents of the hopper 4 with several batch-roasters can thus be treated and finished much more quickly. The connections for such additional batch-roasters are indicated at 10', 10" and 10"'.

This method is thus well adapted for roasting coffee beans in large volume to make the coffee taste right to the consumer, and at the same time reduce the expense, time and labor to the lowest possible level. By the cycle of preroasting is obtained that subtle taste benefit that is derived from mutual interchange of water vapors between the beans during the initial temperature elevation, and a mellowing of the green beans, which appears to benefit the beverage quality of the final product.

It is evident that with a reduced cycling period and with a reduction of equipment and the consequent economy of floor space that a considerable lowering of operating costs would result.

The finishing roast equipment, being required to operate for the sole purpose of developing desirable flavors, would be made more efficient and subject to better technical control and, therefore, would perform the finishing roast operation in a more satisfactory manner than similar equipment used for the complete roasting cycle.

Having described our invention, what we believe to be new and desire to secure and protect by Letters Patent of the United States is:

1. The method of treating coffee beans to render them suitable for beverage purposes, which comprises subjecting a large quantity of same to a time and temperature roasting treatment sufficient to dehydrate the beans to a substantial extent, and at temperatures in the range of about 300–350° F., but insufficient to cause formation therein of relatively large amounts of volatile organic acids, then subjecting said quantity in smaller batches, respectively to another time and temperature treatment separate from the first, and controlling such treatment of each batch to terminate when the rate of expulsion of volatile organic acids from the beans approximates a predetermined value.

2. The method of treating coffee beans to render them suitable for beverage purposes, which comprises subjecting same to a time and temperature roasting treatment sufficient to dehydrate the beans to a substantial extent, and at temperatures in the range of about 300–350° F., but insufficient to cause formation therein of relatively large amounts of volatile organic acids, then subjecting the beans to another time and temperature treatment separate from the first, and controlling the latter treatment to terminate when volatile organic acids expelled from the beans approximate a predetermined quantity.

3. The method of treating coffee to render same suitable for beverage purposes, which comprises continuously feeding supplies thereof in relatively large quantities through a heated zone to subject same to a time and temperature treatment sufficient only to roast the coffee to approximately the point of color change, then subjecting the coffee thus treated, in relatively small batches, respectively to another time and temperature roasting treatment while testing the evolved gases, and terminating the latter treatment for each batch at the point when volatile acids have been expelled to a predetermined extent.

4. Method for roasting coffee for beverage purposes which comprises continuously feeding relatively large supplies of the coffee through a preliminary roasting zone at temperatures of about 300° F. or higher, wherein the coffee is subjected to a time and temperature treatment sufficient to expel substantial percentages of the moisture content but insufficient to expel any very substantial amounts of the volatile acid content, then subjecting the coffee thus treated, in relatively small batches, respectively to another time and temperature treatment, and terminating the latter treatment for each batch at the point when volatile acids have been expelled to approximately a predetermined extent.

HERBERT S. POLIN.
JOSEPH F. AIMS.